United States Patent Office 3,136,315
Patented June 9, 1964

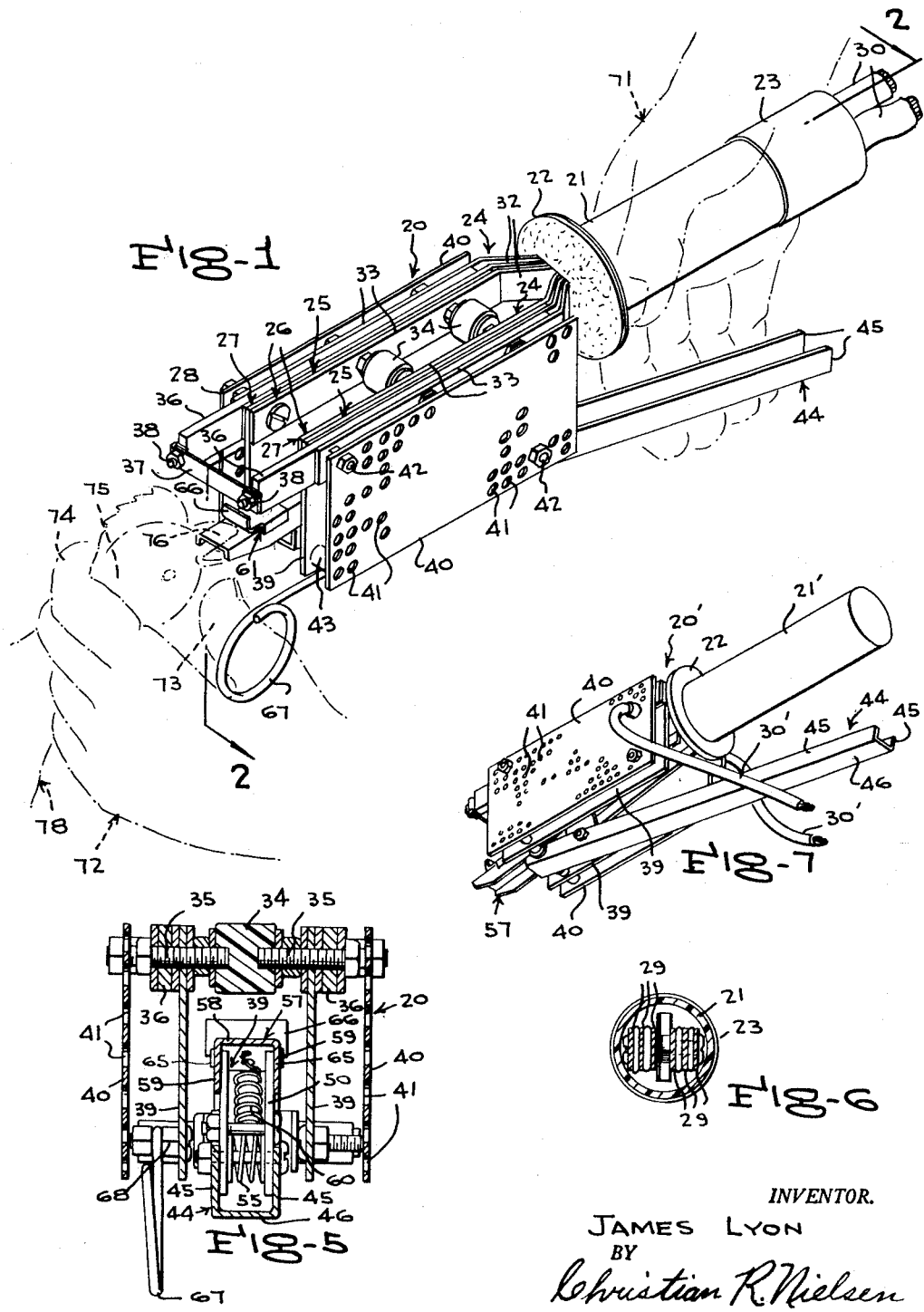

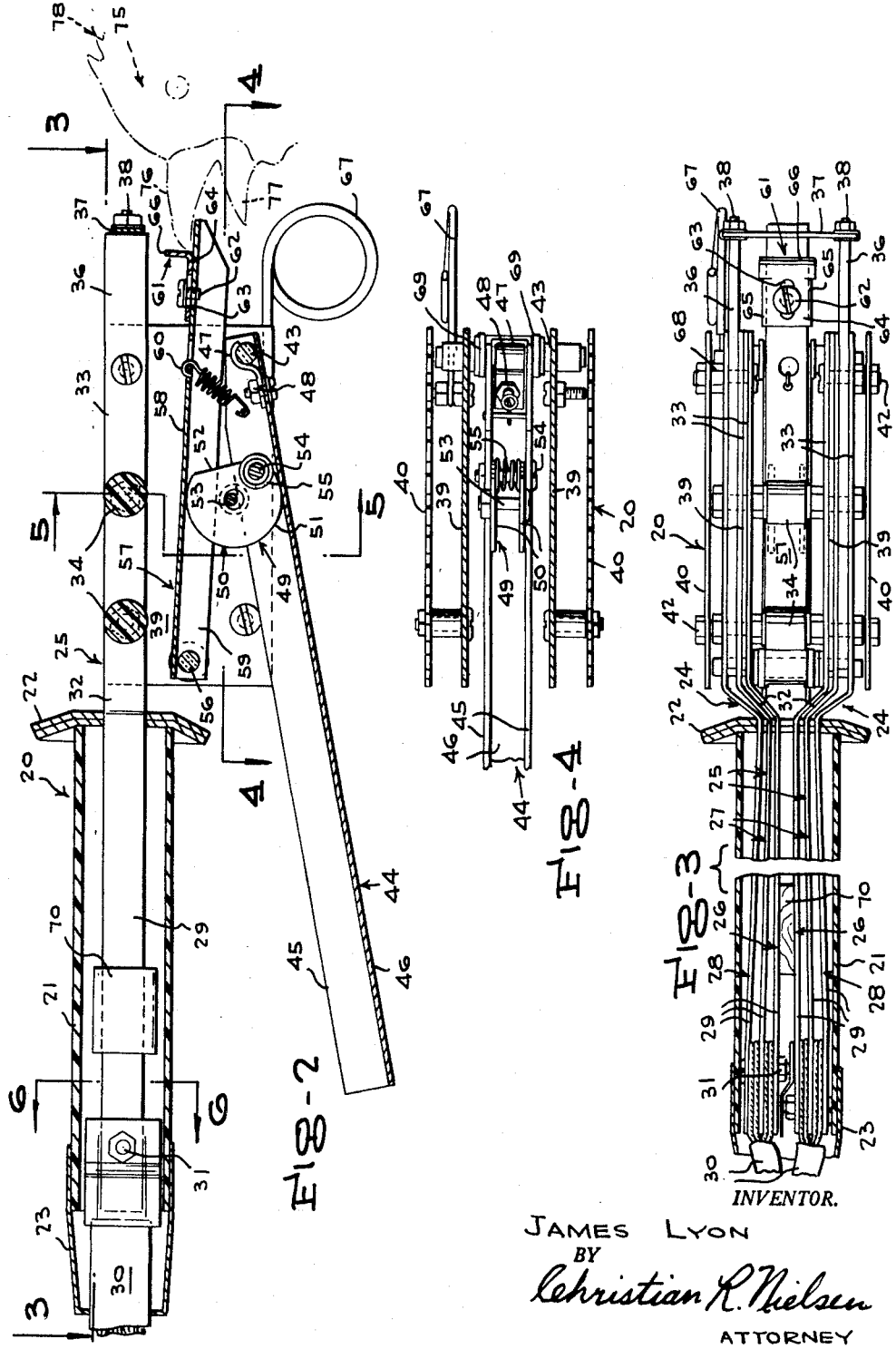

3,136,315
PORTABLE HAND OPERATED BEAK CUTTER
AND CAUTERIZER FOR FOWL AND THE LIKE
James Lyon, 2075 Moore St., San Diego, Calif.
Filed Mar. 1, 1962, Ser. No. 171,475
2 Claims. (Cl. 128—303.1)

This invention relates to a portable means for trimming the beaks of fowl or other poultry and it consists in the constructions, arrangements, and combinations herein described and claimed.

It is an important object of the invention to provide a portable hand operated beak cutter and cauterizing device which may be readily transported to cages containing the fowl, the beaks of which are to be cut and cauterized, rather than removing the fowl from the cages which necessitates unnecessary labor, since the fowl would have to be transported to the location of the beak cutter and cauterizing machines, as at presently employed to perform such operations.

It is a still further important object of the invention to provide a novel construction of leverage, including an adjustable cam member, whereby the pressure between the heated cutter and cauterizing blade and the operating handle may be varied as will be required when operating upon beaks of large mature fowl as compared to beaks of smaller or younger fowl.

Another object of the invention is to provide a beak cutter and cauterizer for fowl and the like which has an easy finger action and improved manipulation, and wherein excellent visibility is insured, and wherein there is provided a beak gauge which may be used if desired or required so as to provide a means for adjustment for length of beak to be removed.

A further object of the invention is to provide a beak cutter and cauterizer which is rugged in structure, foolproof in use, efficient in operation and relatively simple and inexpensive to manufacture and use.

Other objects and advantages will be apparent during the course of the following description.

In the accompanying drawings, forming a part of this application, and in which like numerals are used to designate like parts throughout the same:

FIG. 1 is a perspective view illustrating the beak cutter and cauterizer for fowl and the like and showing the present invention in use.

FIG. 2 is a sectional view taken on the line 2—2 of FIG. 1.

FIG. 3 is a sectional view taken on the line 3—3 of FIG. 2.

FIG. 4 is a sectional view taken on the line 4—4 of FIG. 2.

FIG. 5 is a sectional view taken on the line 5—5 of FIG. 2.

FIG. 6 is a sectional view taken on the line 6—6 of FIG. 2.

FIG. 7 is a perspective view illustrating a modification.

Referring in detail to the drawings, and more particularly to FIGS. 1 through 6 of the drawings, the numeral 20 indicates the beak cutter and cauterizer for fowl and the like of the present invention, and wherein it will be seen that the numeral 21 indicates a cylindrical fitting made of a suitable electrically insulating material, and the fitting 21 defines a handle, and arranged adjacent to the front end of the fitting or handle 21 is a finger guard 22, FIG. 1. The numeral 23 indicates a cylindrical sleeve or collar on the rear end of the handle 21. As shown in the drawings, there is provided a pair of spaced apart holders which are each indicated generally by the numeral 24, and the holders 24 each comprise inner, outer and intermediate body pieces or members, and these body members are indicated generally by the numeral 25, and the inner body member is indicated by the numeral 26, and the intermediate body member is indicated by the numeral 27 and the outer body member is indicated by the numeral 28. These body members 26, 27 and 28 are shaped to define or include straight portions 29 which extend through the handle 21, FIG. 3. Electrical leads or conductors 30 are electrically connected to the portions 29 as for example by means of securing elements 31, and the leads 30 are adapted to be connected to a suitable source of electrical energy, and for example the leads 30 may be electrically connected to a suitable transformer.

The body members further include offset second portions 32 and straight third portions 33, and interposed between the third portions 33 are insulated bushings 34 which are adapted to be retained in place as for example by means of securing elements or screws 35, FIG. 5. The numeral 36 designates each of a pair of spaced parallel conductor bars which are interposed between the third portions of the intermediate and outer body members and are connected thereto. A cutting and cauterizing blade 37 is connected to the outer projecting ends of the bars 36 as at 38, for a purpose to be later described.

As shown in the drawings there is provided a pair of spaced parallel frame pieces 39 which are interposed between the third portions of the inner and intermediate body members and which are secured thereto. A pair of spaced parallel apertured plates 40 are arranged adjacent to the outer surfaces of the frame pieces 39 and are connected thereto at at 42, the numeral 41 in FIG. 1 indicating the apertures or perforations in the plate 40 which help insure that there will be efficient dissipation of heat from the device through the medium of the aperture or openings 41.

The numeral 43 indicates a first insulated pivot pin which extends through and between corner portions of the frame pieces 39, and a channel shaped lever 44 is pivotly connected to the pivot pin 43. As shown in the drawings the lever 44 includes the web portion 46 as well as spaced parallel elongated flanges 45. A clip 47 is connected to the lever 44 as at 48, and the clip 47 engages the pin 43.

Operatively connected to the lever 44 is a cam which is indicated generally by the numeral 49, and the cam 49 is shown to comprise a pair of spaced parallel similar base pieces 50 which are each shaped to include arcuate edges 51 as well as flat or straight edges 52, and the base pieces 50 are interconnected by means of a securing element 53. The base pieces of the cam 49 are adjustably or pivotly connected to the flanges 45 of the lever 44 by means of a pivot pin or securing element 54. A coil spring 55 is interposed between the base pieces 50 and is mounted on the securing element 54 for exerting the desired amount of holding pressure on the base pieces 50.

The numeral 56 indicates an insulated pivot pin which extends between the frame pieces 39 and which is connected thereto. A channel shaped support member 57 is pivotly mounted on the pivot pin 56, FIG. 2. The support member 57 includes a top portion 58 as well as spaced parallel side portions 59. The numeral 60 indicates a spring member or coil spring which has one end anchored to the support member 57 while the other end of the spring member 60 is suitably anchored to the lever 44.

The numeral 61 indicates a stop member which provides a gauge, and the stop member 61 is adjustably connected to the support member 57. The stop member 61 includes a main body portion 64 which has a slot 63 therein, and a securing element 62 extends through the slot 63 and engages the top portion 58 of the support member 57, and the stop member or gauge 61 further includes spaced parallel flanges 65 which depend from the main body portion 64 and which are arranged contiguous to the outer side portions of the support member 57. There is further provided on the gauge or stop member 61 a lip or flange 66 which is arranged at right angles with respect to the main body portion 64.

The numeral 67 indicates a finger loop which is arranged contiguous to one of the frame pieces 39 and which is connected thereto as at 68.

Attention is directed to FIG. 7 of the drawings wherein there is illustrated a modified beak cutter and cauterizer which is indicated generally by the numeral 20' and the tool 20' has a construction and operation generally the same as the previously described device 20. However, the device 20' of FIG. 7 has its input leads or conductors 30' connected to the tool immediately in front of the handle 21' instead of at the rear of the handle as shown in FIGS. 1 through 6.

In FIG. 4 for example, the numeral 69 indicates insulated washers which help maintain the parts properly electrically insulated in the desired or required manner. In FIG. 2 the numeral 70 indicates a spacer which is adapted to be made of insulated material for maintaining the proper spacing between the groups of members 25 in the handle 21.

In FIG. 1 the numeral 71 indicates in broken lines a portion of a person's hand which is arranged in engagement with the handle 21, and the numeral 72 in FIG. 1 indicates the portion of the other hand of the user, and the thumb 73 of the hand 72 is adapted to be conveniently extended through the loop 67. Thus with the fingers 74 engaging the neck or head portion 75 of the fowl 78, the upper beak 76 is adapted to be arranged in engagement with the stop gauge 61 as shown in FIGS. 1 and 2 so that upon proper manipulation of the tool, the upper beak 76 can be cauterized and cut off at the desired point. In the drawings the numeral 77 indicates the lower beak of the fowl.

In use, with the parts arranged as shown in the drawing, it will be seen that there has been provided a beak cutter and cauterizer for fowl, and when the tool of the present invention is being used, the tool is adapted to be electrically connected to a suitable source of electrical energy, as for example by means of the leads or conductors 30, and electrical energy will flow through the members 25 and cause the blade 37 to become heated due to the flow of electric current. When the upper beak 76 of a fowl 78 is to be cauterized and cut off, the fowl 78 is adapted to be held as for example as shown in FIG. 1, and the provision of finger loop 67 helps the user steady the device and fowl. By positioning the upper beak 76 on the member 57 in engagement with the stop gauge 61, and then by squeezing the lever 44 and handle 21 together, the member 57 will be caused to pivot on its pivot pin 56 whereby the beak 76 and hot cutting blade 37 will be brought into engagement with each other so that the beak 76 will be cut off at the desired point.

When manual pressure is released on the lever 44, the parts will return to an open position such as that shown in FIG. 2 ready to be used again, due to the provision of the spring 60.

The cam 49 serves to cause the desired and necessary pivotal movement of the member 57 as the lever 44 and handle 21 are squeezed together, and the cam 49 is constructed so that it can be adjusted in order to vary the effectiveness of the cam. To adjust the cam 49, it is only necessary to loosen the securing element 54 whereby the base pieces 50 can be adjusted to the desired position. Then the securing element 54 can have its nut tightened in order to maintain the base pieces 50 immobile in their adjusted positions. The spring member 55 on the securing element 54 helps exert the desired pressure on the base pieces 50 so as to help maintain these parts in their proper relation relative to each other.

The stop gauge 61 is constructed so that by loosening the securing element 62, the gauge 61 can be shifted or adjusted on the member 57, and after the gauge 61 has been adjusted to its desired location, the securing element 62 is adapted to be tightened in order to maintain the gauge 61 stationary in its desired location or position.

The parts can be made of any suitable material and in different shapes or sizes.

It will therefore be seen that according to the present invention there has been provided a tool or appliance for trimming beaks of fowl as for example in order to prevent animals or fowl from attacking each other and in order to discourage cannibalism and in order to minimize waste of feed as well as to improve the quality of the fowl.

An important aspect or feature of the present invention is the unique leverage and the front support for safety and steadiness during operation.

FIG. 7 illustrates a modification of the lead hook-up, and in FIG. 7 the transformer leads may be attached to the tool immediately in front of the handle instead of at the rear of the handle as in the other views.

With further regard to the hand tool of the present invention it is to be noted that there is provided an efficient and advantageous leverage which utilizes a cam and this arrangement gives a mechanical advantage which is quite desirable. Ease of operation is insured, and the pivot mounting in the present invention greatly increases the ease of use by the operator.

Another important feature of the present invention is the absence of awkward and cumbersome wire leads or connections to the heating element or blade, and this advantage is created by electrically separating each side of the hand tool, and this separation of bare metal parts is perfectly safe because the voltage between the halves is less than 5 volts. Insulation is accomplished by various types of insulating spacers which hold the parts firmly together without shorting the circuit by connecting them electrically, and the axles or shafts required are prevented from shorting out the halves of the hand tool either by the use of strong rods of insulating material (such as high quality porcelain) or by insulating bushings encircling a metal shaft.

Still another important feature of the present invention is that each half of the debeaking tool also serves as a cooling fin to dissipate non-utilized heat conducted from the cauterizing blade.

The wire loop 67 at the end of the tool is for the convenience and safety of the operator when debeaking unruly birds. Older birds are usually debeaked by forcing the forefinger into the mouth of the bird and placing the upper mandible over the beak support. One of the other fingers of the same hand can then be placed within the wire circle to steady the hand tool for increased accuracy and for reducing the possibility of burning the operator.

Attention is also directed to the adjustable gauge or stop 61 on the beak support, and this gauge may be used optionally but preferably is to be included as standard equipment, and it measures the upper mandible and has no similarity to the gauges of prior similar devices which heretofore have measured the lower mandible for example. This measurement of the lower mandible is thought to be practically worthless because the bird's lower mandible is loosely hinged and consequently is not a true gauge for the position of the upper mandible. Also, the gauge 61 includes the flanges 65 which serves to keep the stop at right angles to the beak. The present invention is adapted to give a square clean cut with minimum effort.

The tool of the present invention can be operated from any suitable transformer, with a rheostat in the primary circuit so that the temperature of the blade can be adjusted. The control box is adapted to be utilized wherein the attachment cord can be plugged into the control box and this will help increase the convenience in use as it solves the tangled cord problem. Such a box may be supplied with handles for hand or shoulder straps in case it is being carried instead of carted, and the transformer may have a cooling fan. Also, the tool may be powered by a storage battery arrangement for short periods of use.

It will therefore be seen that according to the present invention there has been provided a portable hand type beak cutter and cauterizer. Inasmuch as some operators like to sit by a chick box, picking chicks up with their left hand and debeaking with the right, the tool of the present invention eliminates the necessity of transporting the bird to the debeaking location. In addition, some cage operators like equipment which permits them to debeak the bird without removing it from the cage, and only the bird's neck and head are handled.

The tool of the present invention is adapted to utilize an extra strong blade, and the blade is adapted to be made strong enough so that it will handle turkeys. The beak gauge is adapted to be provided optionally so that where desired an adjustment for length of beak could be removed is provided. Also, the cutting edge gets red hot so that there is ample heat and wherein reserve heat is available for low voltage conditions and lower extension cords. Fingertip heat control is adapted to be provided for adjustable temperature so that the temperature can be set for the cauterizing treatment. Also an easy finger action is insured since the compound leverage permits the operator to treat tough beaks with ease. There is a fast heat-up and operating temperature is adapted to be reached within a very short period of time. There is also a freedom from protruding connections and there are no wires up front to get in the way. Improved manipulation is insured and the cutter-and-cauterizer is a special construction for easy handling and leads are flexible in spite of their capacity. Excellent visibility is insured and the end of the beak is visible during operation from the top or side, and the beak stop is in full wire.

Minor changes in shape, size and rearrangement of details coming within the field of invention claimed may be resorted to in actual practice, if desired.

What is claimed is:

1. A beak cutter and cauterizer for fowl comprising a handle, body members having portions connected to said handle and said body members functioning as current conductors and heat radiators, a beak cutting and cauterizing element operatively connected to said body members, frame pieces operatively connected to said body members, spaced parallel apertured plates arranged contiguous to the outer surface of said frame pieces and connected thereto, a support member pivotly mounted between said frame pieces, a pivotly mounted lever having means thereon for selectively engaging said support member, said last named means comprising an adjustable cam, resilient means interposed between said support member and lever and operatively connected thereto, said last named resilient means comprising a coil spring, and a finger loop operatively connected to one of the frame pieces.

2. A beak cutter and cauterizer for fowl comprising a handle, current conducting, heat radiating body members shaped to embody portions which extend through said handle, and the portions that extend through the handle being affixed to said handle, a pair of spaced parallel conductor bars connected to said body members, a cutting and cauterizing blade extending between the ends of said bars and secured thereto, a pair of spaced parallel frame pieces positioned contiguous to said body members, means connecting said frame pieces to said body members, spaced parallel apertured plates arranged contiguous to the outer surfaces of said frame pieces and connected thereto, a first pivot pin extending between corner portions of the frame pieces and connected thereto, a lever pivotly connected to said pivot pin, a cam adjustably connected to said lever, a second pivot pin spaced from said first pivot pin, said second pivot pin being connected to said frame pieces, a support member pivotly connected to said second pivot pin and said support member adapted to be engaged by said cam, a coil spring operatively connected between said support member and lever, a stop gauge adjustably connected to said support member, and a finger loop arranged contiguous to one of the frame pieces and operatively connected thereto.

References Cited in the file of this patent

UNITED STATES PATENTS

| 1,988,293 | Arnesen | Jan. 15, 1935 |
| 2,719,904 | Treis | Oct. 4, 1955 |
| 2,742,904 | Lyon | Apr. 24, 1956 |

FOREIGN PATENTS

| 837,141 | Great Britain | June 9, 1960 |